US007131182B2

(12) United States Patent
Yeh et al.

(10) Patent No.: US 7,131,182 B2
(45) Date of Patent: Nov. 7, 2006

(54) METHOD FOR ASSEMBLING SUPPORTING DISK OF MOTOR ROTOR

(75) Inventors: Dung-Chang Yeh, Taipei (TW); Yung-Ping Lin, Taipei (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 370 days.

(21) Appl. No.: 10/427,905

(22) Filed: May 2, 2003

(65) Prior Publication Data

US 2004/0143957 A1 Jul. 29, 2004

(30) Foreign Application Priority Data

Jan. 24, 2003 (TW) .............................. 92101611 A (51) Int. Cl.
*H02K 15/02* (2006.01)
*H02K 15/10* (2006.01)

(52) U.S. Cl. .................. 29/598; 29/596; 29/603.03; 29/732; 29/759; 29/760; 29/898.062; 384/617

(58) Field of Classification Search .................. 29/598, 29/596, 603.03, 732, 759, 760, 898.062; 384/617
See application file for complete search history.

(56) References Cited

U.S. PATENT DOCUMENTS 5,529,404 A * 6/1996 Robinson et al. ........... 384/617
6,158,112 A * 12/2000 Kim et al. .................... 29/759
6,453,541 B1 * 9/2002 Guthrie et al. ........... 29/603.03

* cited by examiner

*Primary Examiner*—A. Dexter Tugbang
*Assistant Examiner*—Tim Phan
(74) *Attorney, Agent, or Firm*—Birch, Stewart, Kolasch & Birch, LLP (57) ABSTRACT

An assembly method and fixture for assembling a supporting disk of a motor rotor according to the invention is based on an "adjusting, and fixing" concept. A functional axis fixture and an adjusting axis fixture, which can match with each other for holding the supporting disk and the rotor, are first prepared. The functional axis of the supporting disk is aligned with the geometric axis of the functional axis fixture, and the geometric axis of the rotor is aligned with the geometric axis of the adjusting axis fixture. By engaging the functional axis fixture and the adjusting axis fixture, the functional axis of the supporting disk is aligned with the geometric axis of the rotor. Therefore, the bias and concentricity can be precisely controlled and improved.

14 Claims, 8 Drawing Sheets

METHOD FOR ASSEMBLING SUPPORTING DISK OF MOTOR ROTOR

CROSS REFERENCE TO RELATED DOCUMENT

This application claims priority to Taiwanese Patent Application No. 92101611, filed on Jan. 24, 2003.

BACKGROUND OF THE INVENTION

1. Field of the Invention

The invention generally relates to a method and fixture for assembling supporting disk to a motor rotor, which is applicable to spindle motor for optical disk; and particularly relates to a method and fixture for assembling supporting disk to a motor rotor, through which the bias and concentricity are improved at one time.

2. Related Art

Accompanying with technical developments of mass data storage with optical disks, the precision requirements of spin motor for optical disk driver are getting higher and higher. In recent developments of HD-DVD, DVD-RAM and DVD-RW devices, for example, the axial bias and radial concentricity of the spin motor that carries optical disk have to be less than 0.015 mm and 0.03 mm respectively. An excellent performance and reliable data tracking of the disk driver relies on such a strict precision.

Figure 1A:
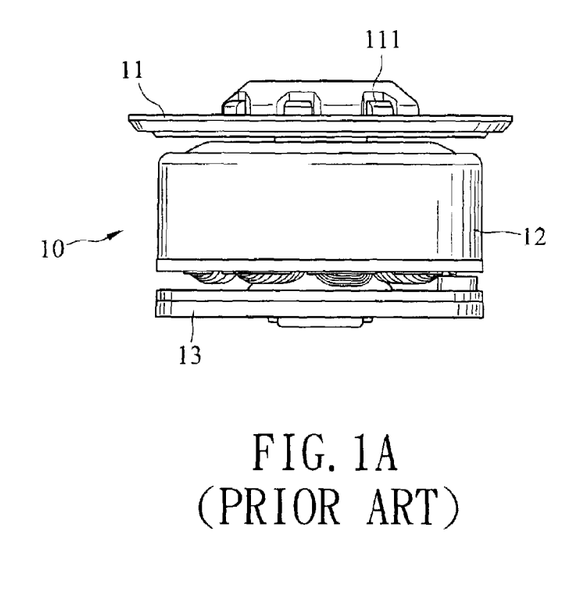
FIG. 1A is a side view of a conventional spin motor and supporting disk assembly.
Figure 1B:
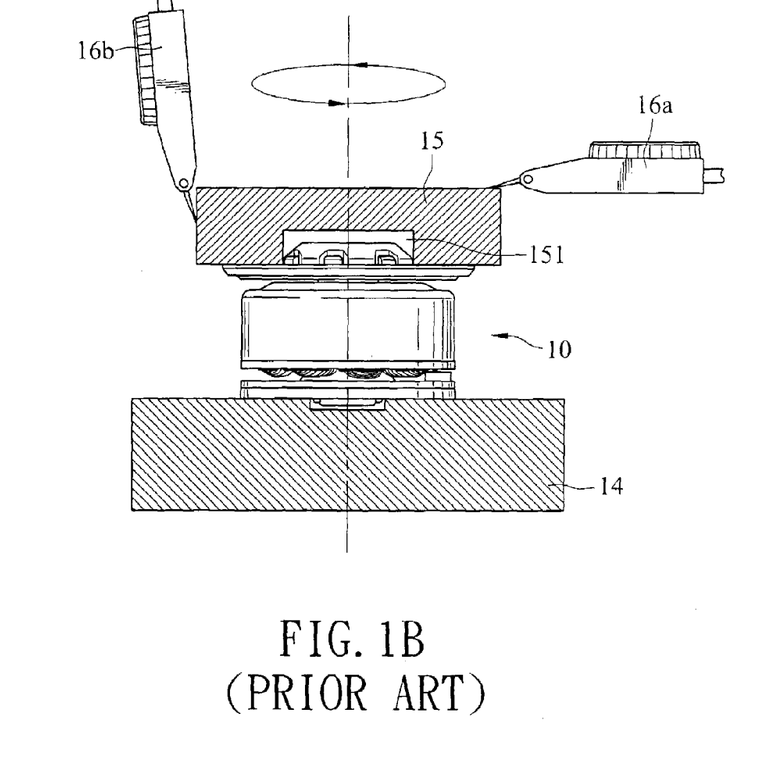
FIG. 1B is an explanatory view of a conventional method for checking the bias and concentricity.

However, such precision requirements are very difficult for the current manufacturing process. FIGS. 1A and 1B illustrate a conventional spin motor and the method of measuring axial bias and radial concentricity. The spin motor 10 includes a stator 13, a rotor 12 and a supporting disk 111 mounted on the rotor 12. A plurality of jaws 111 are mounted in the central potion of the supporting disk 11 for grasping the center hole of an optical disk (not shown in the drawing) and driving the optical disk rotating along. In order to firmly grasp the optical disk, an anti-glide ring is usually formed concentrically around the jaws 111. The bias and concentricity of the spin motor 10 is checked as follows. Fixing the spin motor 10 on a base 14. Loading a measuring jig 15 on the supporting disk. The measuring jig 15 has a center hole 151 to be grasped by the jaws 111. Then, using micrometers 16a, 16b at top and circumference surfaces of the measuring jig 15 to measure the bias and eccentricity of the spin motor 10 by rotating the measuring jig 15.

The prior arts for improving the precision problems are usually by ways of improving component precision and adding supplementary processes during or after assembly. However, they still have difficulties and limitations as described below.

1) By Improving the Precision of Supporting Disk and Anti-glide Ring

Improving the precision of supporting disk is a straight and useful solution for improving the precision of spin motor. However, it is rather difficult to achieve the required bias and concentricity specifications by common process. Because the supporting disk has a complicated configuration that is usually made by plastic injection molding in order to lower the cost. The parameters of injection molding process, such as temperature, flow passage, thermal shrinkage and precision of mold, are complicated to control. Therefore, in order to meet the 0.03 mm concentricity requirement, the mold and the process have to be delicately modified and carefully controlled. The 0.015 mm bias requirement that depends on excellent molding and manufacturing techniques is further difficult to obtain.

Also, the 0.015 mm axial bias of the supporting plate requires thickness parallelity tolerance of the anti-glide ring being within 0.015 mm. It is not easy to achieve for rubber or silicone moldings that require specific molding and manufacturing attendance.

The aforesaid reasons make the component precision control difficult and expensive.

2) By Adding Supplementary Process During or After Assembly

It is possible to re-machine the assembly of rotor and supporting disk by lathing or grinding, or furnishing anti-glide material on surface of the supporting disk so as to improve the precision of the assembly. However, the post machining only improves the bias but does not help the concentricity. Further, the machining generates dusts that may cause trouble to the assembly. The furnishing of anti-glide material is less reliable because it cannot produce surface patterns that are preferred for a higher reliability.

Some manufacturers apply multiple anti-glide rings on the supporting disk. By using rings of different thickness, the bias can be reduced. However, the process is complicated and time-consuming. The process is also helpless to the concentricity.

In different applications of the supporting disks, there are also functional axis problems of columnar variance, vibration, angular shift, angular velocity, tangent velocity, acceleration and so on. However, these parameters, similar to aforesaid bias and concentricity, are caused by fixing and adjustment of the rotor and supporting disk and have bothered the manufactures for a long time.

SUMMARY OF THE INVENTION

The object of the invention is to provide a method and fixture for assembling the supporting disk to a motor rotor. Departing from conventional thinking, the invention uses a method of "adjusting, and fixing" for assembling the supporting disk and the rotor. The method requires components of less precision that can reduce the cost while improve the assembly precision of less bias and higher concentricity.

An assembly method and fixture for assembling a supporting disk of a motor rotor according to the invention is based on an "adjusting, and fixing" concept. A functional axis fixture and an adjusting axis fixture, which can be engaged with each other for holding the supporting disk and the rotor, are first prepared. By engaging the functional axis fixture and the adjusting axis fixture, the functional axis of the supporting disk is aligned with the geometric axis of the rotor. Then, a stable and less influence method is used to fix the supporting disk and the rotor so that the bias and concentricity is improved through the precision controls of the fixtures.

The functional axis fixture in the invention is used to get the functional axis of the supporting disk. The functional axis means a specific working axis of the object carried by the supporting disk. Taking an optical disk for example, the functional axis is the geometric axis of the optical disk. The adjusting axis fixture in the invention is used to hold the rotor, and to engage with the functional axis fixture. When engaging the adjusting axis fixture and the functional axis fixture, the rotor and the supporting disk are aligned accordingly. By adjusting the functional axis fixture and the adjusting axis fixture, and fixing the supporting disk and the rotor, the precision of the assembly is effectively controlled.

The functional axis fixture is formed with a cavity for holding a supporting disk, and a plate having a same dimension of center hole of an optical disk for getting the functional axis after assembling the supporting disk. The adjusting axis fixture is formed with a cavity for holding the rotor. An axis of the adjusting axis fixture is pre-adjusted and aligned with the center hole axis of the plate of functional axis fixture. So, after engaging the two fixtures, the functional axis of the supporting disk is aligned with the axis of the rotor. Then, using a stable and less influence method to fix the rotor and the supporting disk, the bias and concentricity of the rotor and the supporting disk is therefore controlled and improved.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

An assembly method and fixture for assembling a supporting disk of a motor rotor according to the invention is based on an "adjusting, and fixing" concept. A functional axis fixture and an adjusting axis fixture, which can be engaged with each other for holding the supporting disk and the rotor, are first prepared. By engaging the functional axis fixture and the adjusting axis fixture, the functional axis of the supporting disk is aligned with the geometric axis of the rotor. The fixtures can solve the functional axis problems of columnar variance, vibration, angular shift, angular velocity, tangent velocity, acceleration and so on.

The invention works on a supporting disk having a functional axis and a motor rotor having a rotation axis. A gap is preset between the supporting disk and the rotor for adjusting the relative position of the two. A set of fixture is provided for adjusting the distance and angle of the functional axis of supporting disk and the rotation axis of the rotor and aligning the functional axis to the rotation axis. The supporting disk and the motor rotor are then fixed to obtain a motor of specific function. The invention includes a functional axis fixture and an adjusting axis fixture for mounting the supporting disk and the rotor respectively. The two fixtures can be engaged for aligning the supporting disk and the rotor. The following description is an embodiment of the invention applicable to optical disk driver in which the concentricity and bias of the supporting disk and the rotor are well controlled.

Figure 2:
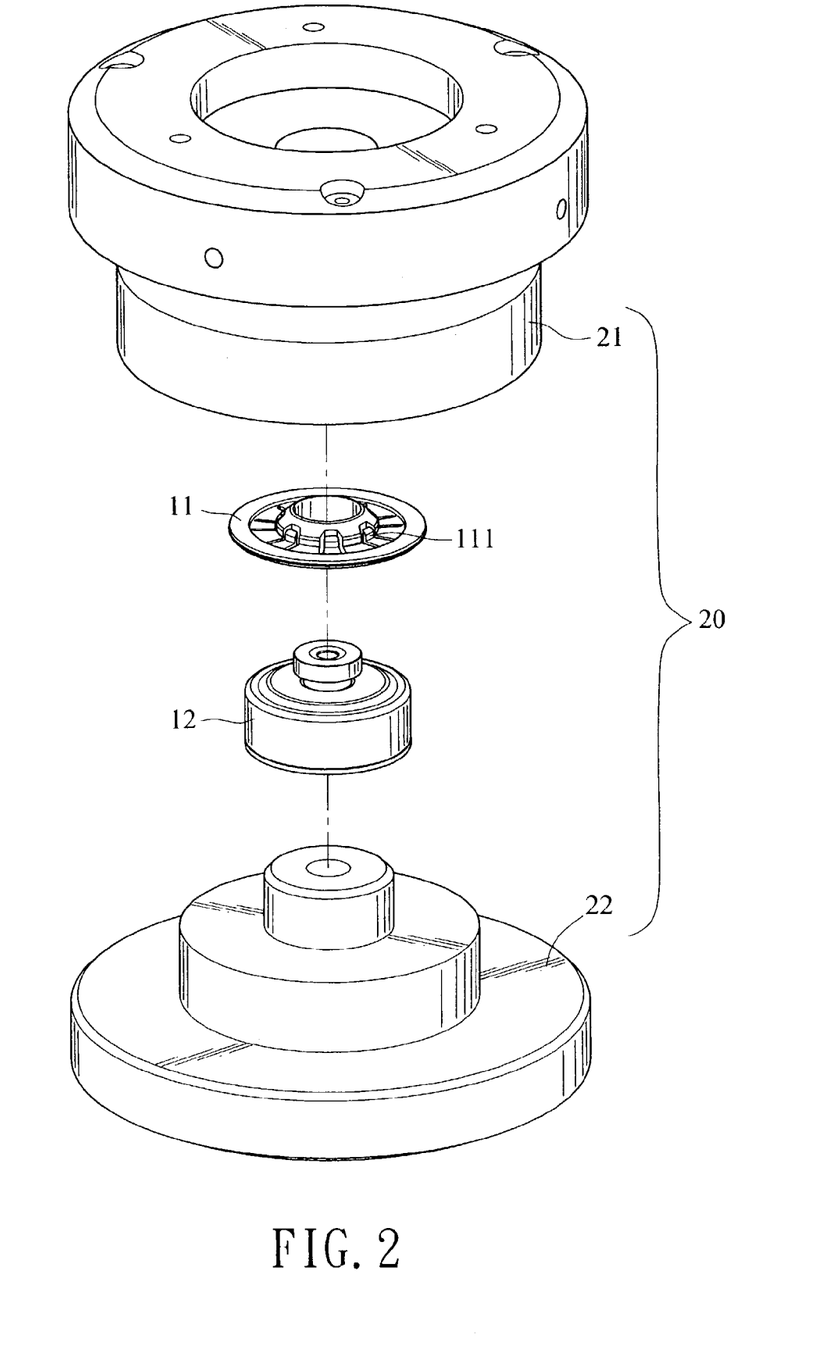
FIG. 2 is a perspective view of a fixture according to the invention.

As shown in FIG. 2, a set of fixture 2 of the invention includes a functional axis fixture 21 and an adjusting axis fixture 22. The functional axis fixture 21 is for mounting a supporting disk 11. The adjusting axis fixture 22 is for mounting a motor rotor 12. The function axis fixture 21 is used to get a specific functional axis of the supporting disk 11. A functional axis is described below.

Figure 3:
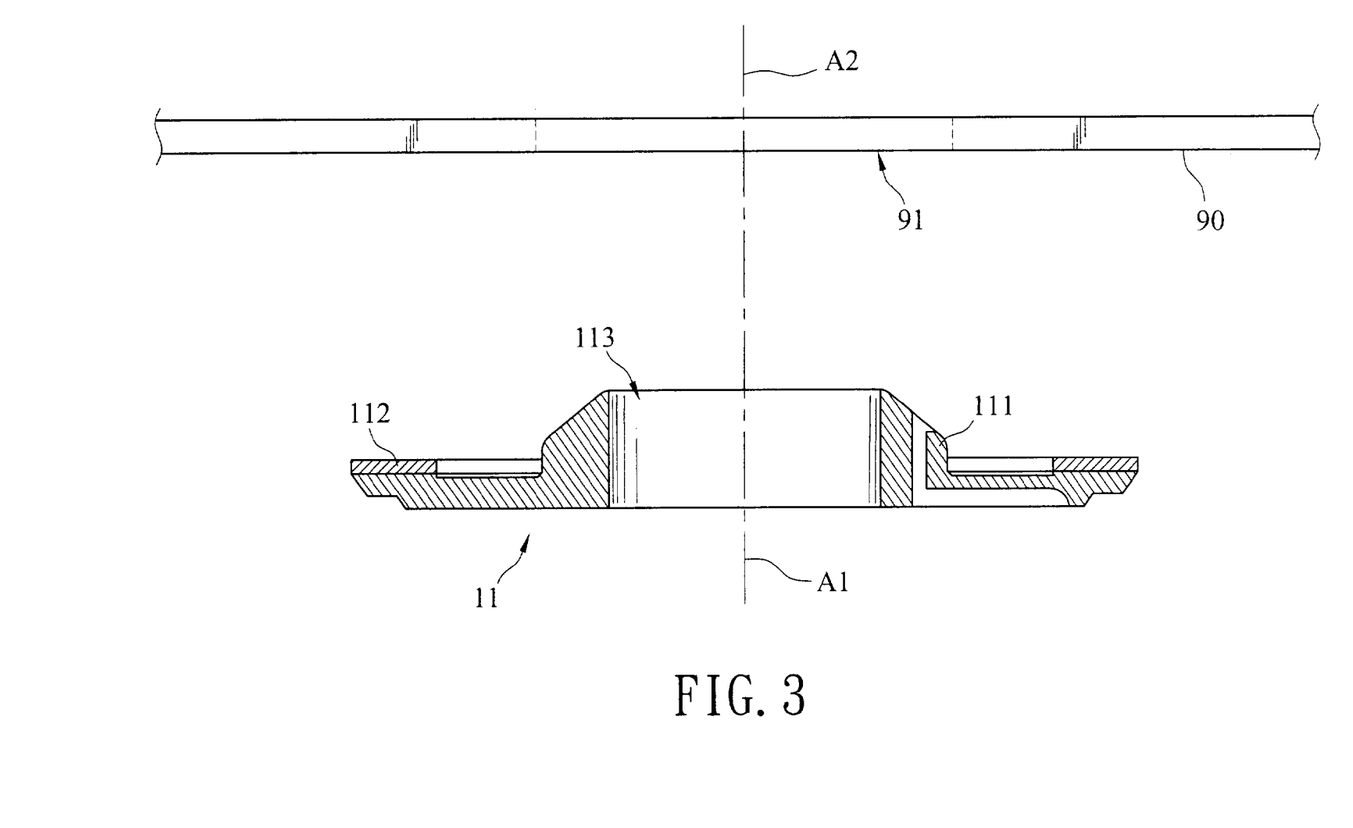
FIG. 3 is a descriptive view of an optical disk to be mounted on a supporting disk of the invention.
Figure 4A:
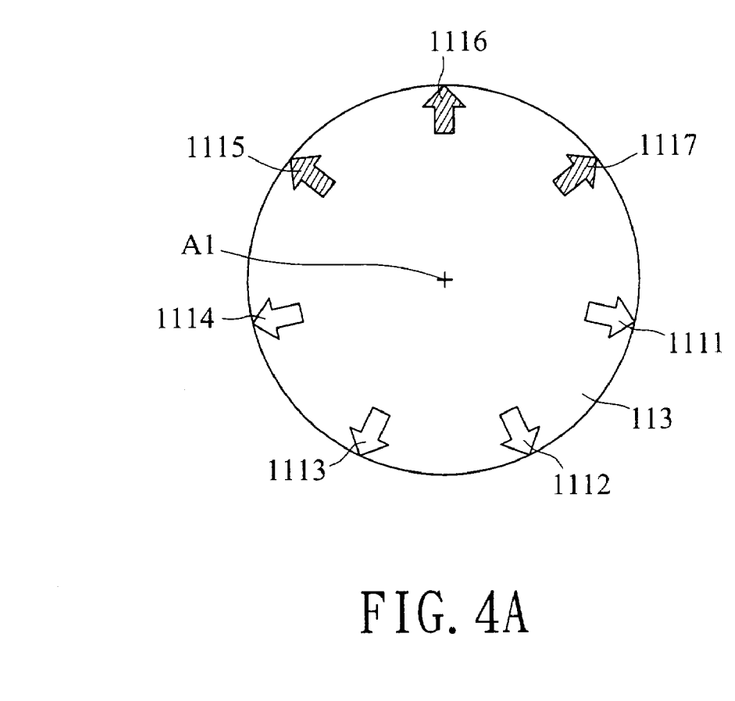
FIGS. 4A and 4B are descriptive views of functional axis of supporting disk in the invention.
Figure 4B:
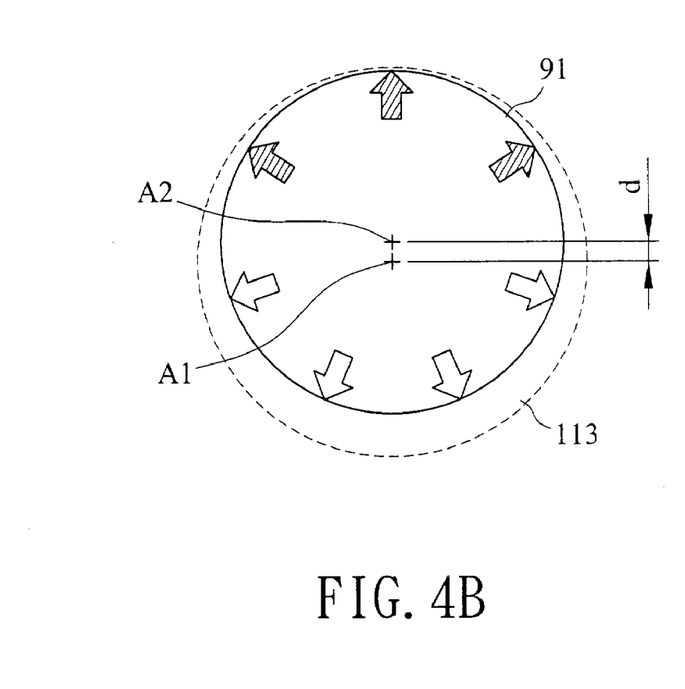

As shown in FIG. 3, a supporting disk 11 is substantially a disk member for supporting an optical disk 90 to rotate. An extrusion 113 is form in the central portion. A plurality of jaws 111 are movably mounted in the circumference of the extrusion 113 for grasping the inner hole 91 of the optical disk 90 and holding the disk 90. An anti-glide ring 112, usually made of rubber or plastic materials for providing friction, is fixed on the surface of the supporting disk 11 for increasing supporting stability to the optical disk 90. Because of the variations of rigidity and strength of the jaws 111, bias and eccentricity will occur when the optical disk is being supported by the jaws 111. For example, as shown in FIG. 4A, there are seven jaws 1111~1117 supporting the optical disk 90. The axis A1 of the supporting disk 11 is at the geometric center of the supporting disk. Ideally, the geometric axis A2 of the optical disk 90 is to be aligned with the axis A1 of the supporting disk 90 when being supported. However, supposing the jaws 1115, 116, 1117 having larger strength than that of the jaws 111, 1112, 1113 and 1114, the geometric axis A2 of the optical disk 90 is then moved upward with a distance d off the geometric axis A1 of the supporting disk 11, as shown in FIG. 4B. In that case, the rotation of the optical disk 90 will get a great wrong if being rotated on the geometric axis A1 of the supporting disk 11. On the contrary, the supporting disk 11 has to be rotated on the geometric axis A2 of the optical disk 90, which is the functional axis of the supporting disk 11 that makes the optical disk 90 rotating in correct tracks.

Figure 5:
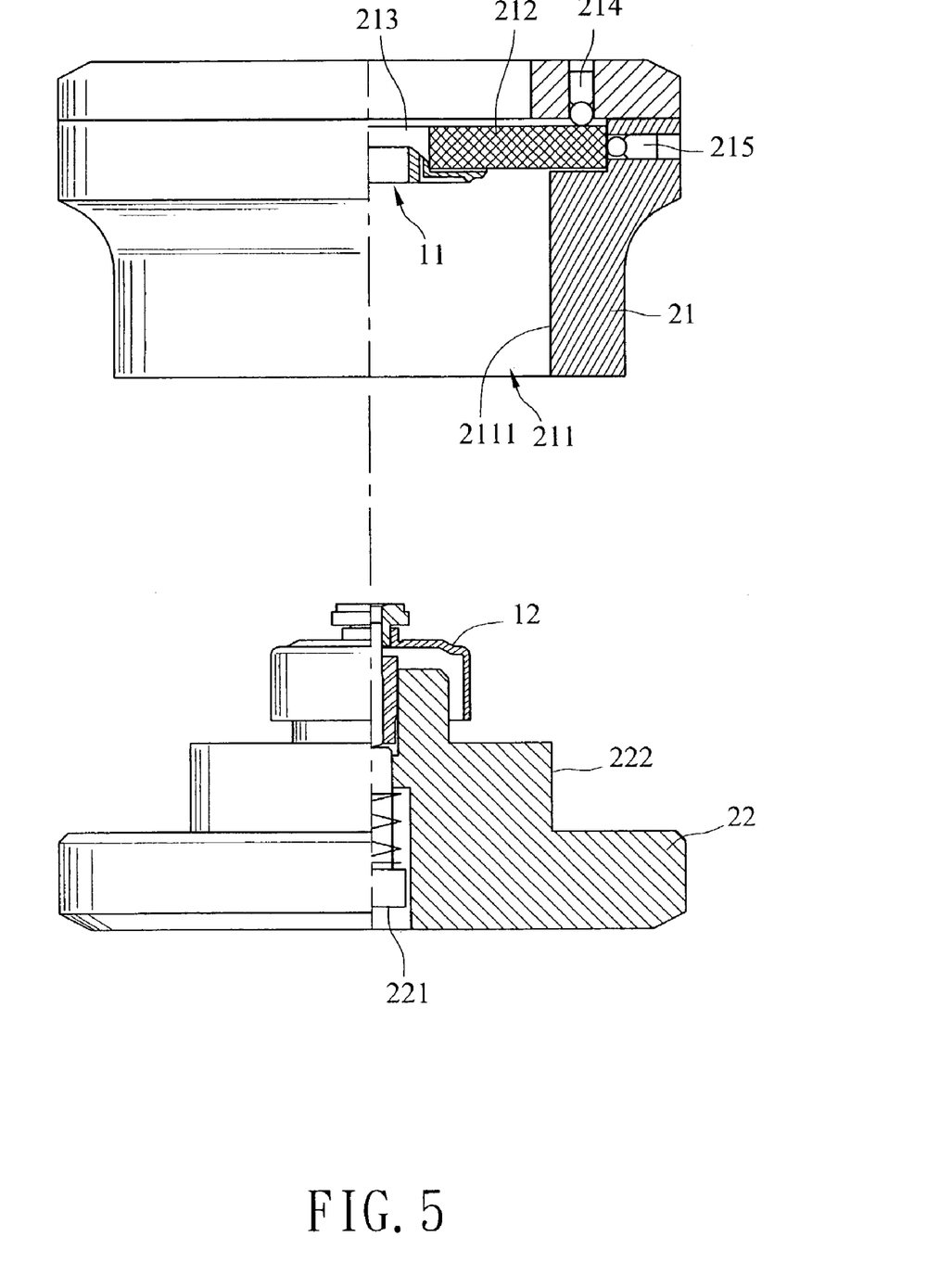
FIG. 5 is a descriptive view of a functional axis fixture and an adjusting axis fixture for mounting a supporting disk and a rotor according to the invention.

Therefore, as shown in FIG. 5, the functional axis fixture 21 includes a cavity 211, and a plate 212 having a central hole 213 the same as the inner hole 91 of an optical disk 90 and a base surface for mounting the supporting disk 11. When the supporting disk 11 is mounted on the functional axis fixture 21, the jaws 111 grasp the hole 213 of the plate 212 so as to get the functional axis of the supporting disk 11. Because the plate 212 is fixed to the functional axis fixture 21, the functional axis of the supporting disk 11 aligns with the axis of the hole 213. The adjusting axis fixture 22 is for mounting the motor rotor 12 and getting the axis of the rotor 12, i.e., the physical axis of the motor 10 and the base for checking bias and concentricity of the supporting disk 11. The adjusting axis fixture 22 gets the axis of the rotor 12 by planar or circumferential surfaces of the mounting portions of the fixture 22 and the rotor 12. Preferably, the geometric axis of the rotor 12 is aligned with the geometric axis of the adjusting axis fixture 22 or its mounting portion.

Before using, the alignment between the functional axis fixture 21 and the adjusting axis fixture 22 is first calibrated. Therefore, upon engaging the functional axis fixture 21 to the adjusting axis fixture 22, the geometric axis of the adjusting axis fixture 22 is aligned with the geometric axis of the hole 213 of plate 212 of the functional axis fixture 21. This is achieved by calibrating the sidewall 222 of adjusting axis fixture 22 with the inner wall 2111 of cavity 211 of the adjusting axis fixture 21. As shown in FIG. 5, the supporting disk 11 and the rotor 12 are mounted on the functional axis fixture 21 and the adjusting axis fixture 22 respectively for obtaining the functional axis of the supporting disk 11 and the axis of the rotor 12.

Figure 6:
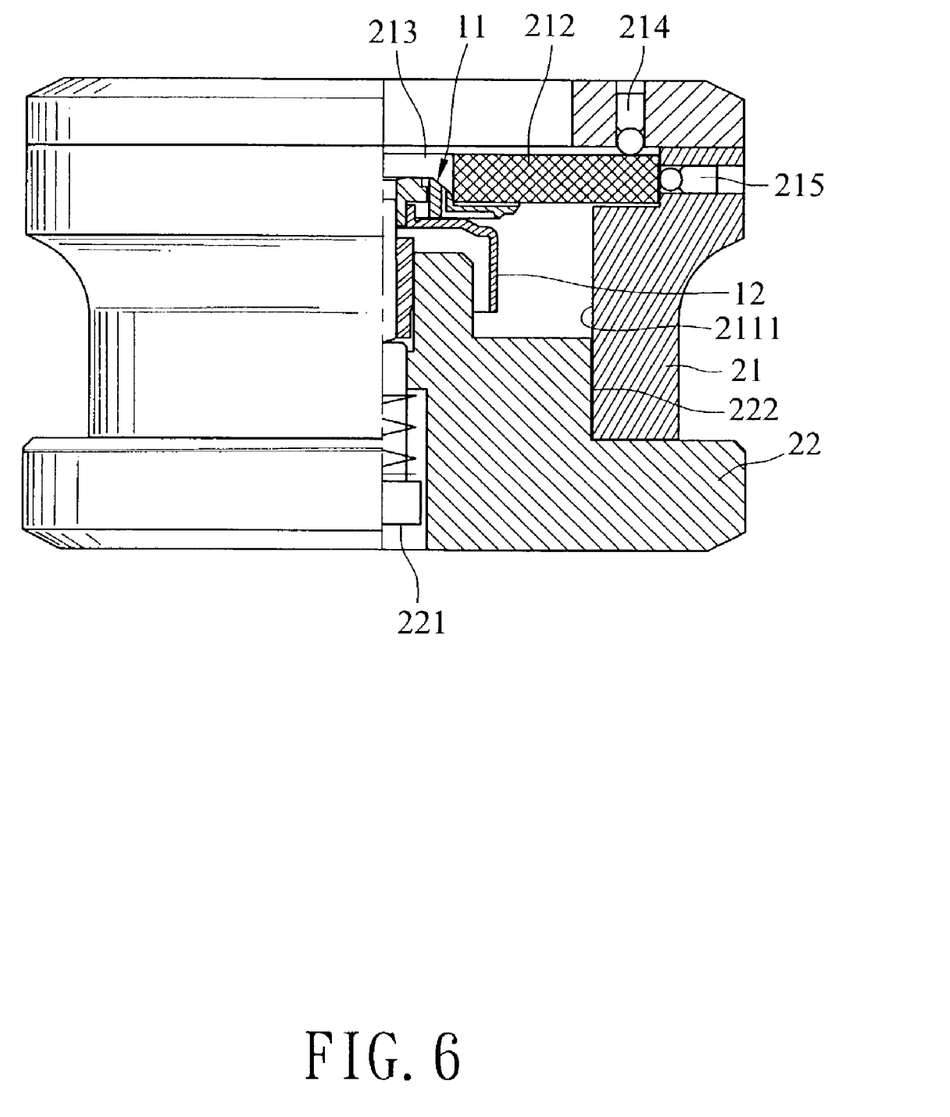
FIG. 6 is a descriptive view of a functional axis fixture and an adjusting axis fixture in the invention when being engaged.

Then, as shown in FIG. 6; the functional axis fixture 21 and the adjusting axis fixture 22 are assembled. As the geometric axis of the adjusting axis fixture 22 has been aligned with the geometric axis of hole 23 of the plate 212 of the functional axis fixture 21; and the axis of the rotor 12 and the functional axis of the supporting disk 11 have been obtained, the axis of the rotor 12 and the functional axis of the supporting disk 11 are aligned accordingly.

Figure 7:
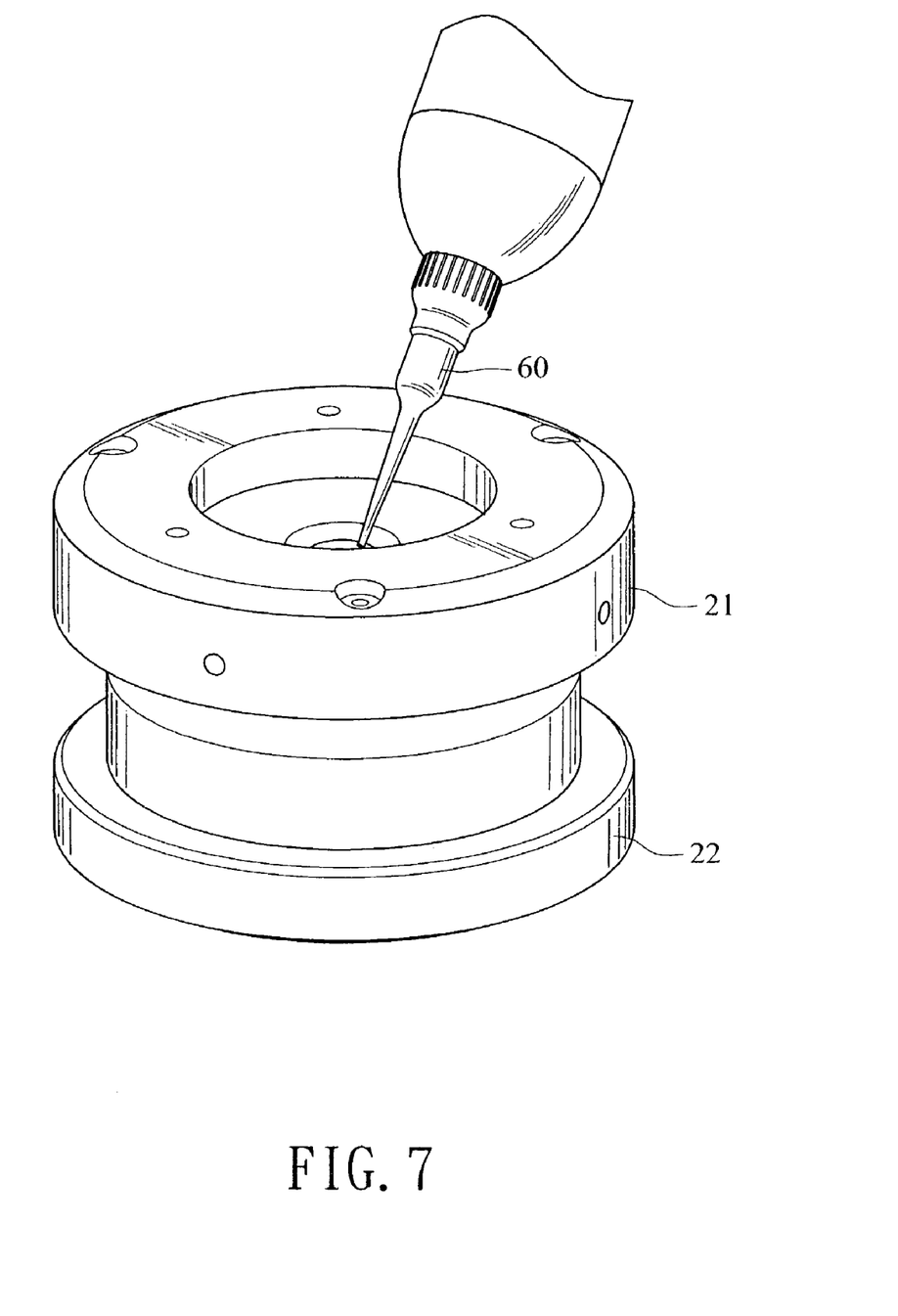
FIG. 7 is a descriptive view of gluing the assembly of the invention.
Figure 8:
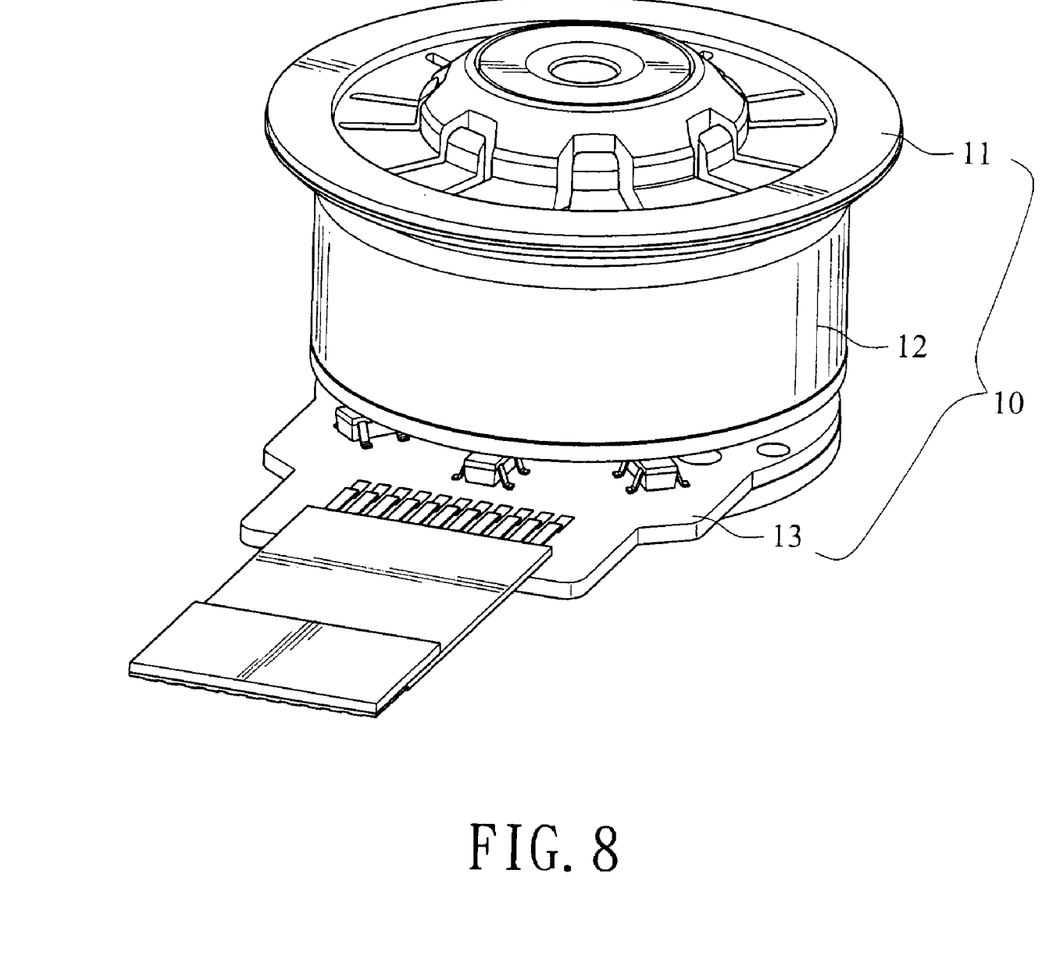
FIG. 8 is a perspective view of an assembly of the invention.

Then, using a reliable and less-influence-to-accuracy method to fix the supporting disk II to the rotor 12. For example, bonding with a third phase binder, such as ultraviolet hardening adhesive, epoxy, one or multiple composition of constructional planar resin, instant adhesive, thermal glue, low melting point metallic filler or non-metallic filler; or through material melting, such as contacting or non-contacting welding, such as laser welding, ultrasonic welding or thermal welding, etc. As shown in FIG. 7, a bottle of glue 60 is used for bonding. After then, an assembly of spin motor 10 with supporting disk 11, rotor 12 and stator 13 is released from the fixtures 21 and 22, as shown in FIG. 8.

In order to assure the supporting disk 11 and the rotor 22 being well assembled through engagement of the functional axis fixture 21 and the adjusting axis fixture 22, the functional axis fixture 21 further includes a horizontal adjusting mechanism 215 and an angular adjusting mechanism 214 for adjusting the position, height and angle of the plate 212. Also, the adjusting axis fixture 22 further includes a height adjusting mechanism 221 for adjusting the height of the rotor 12 when being mounted. The adjusting mechanisms 215, 214 and 221 control the connecting conditions of the supporting disk 11 and the rotor 12, and make the fixtures 21, 22 applicable to different kinds and dimensions of spin motors 10.

Though the above embodiment solves the problems of concentricity and bias, it is apparent that other problems of columnar variance, vibration, angular shift, angular velocity, tangent velocity, acceleration and so on can be solved in the same way and will not described detailedly herein.

An assembly method and fixture for assembling a supporting disk to a motor rotor according to the invention is based on an "adjusting, and fixing" concept. The precision requirements and cost of the components are lower. The precision relative to cost is improved. The bias and eccentricity of the supporting disk can be prevented. Further advantages are:

1) the product precision can be easily obtained in manufacturing only by precision of the fixtures;
2) the variations of supporting disk, anti-glide ring and the accumulated assembly errors can be omitted;
3) the bias and concentricity of the product is adjusted to optimal condition during assembly process that the operator can monitor the precision during assembly without the need of checking the final precision after finishing the product of prior arts;
4) a third phase material is used to bind the supporting disk and the rotor so that the dimensions are not changed during hardening; the process is stable and no dust is generated;
5) the bias and concentricity are adjusted in a same time;
6) specific functional axis, such as bias, concentricity, columnar variance, vibration, angular shift, angular velocity, tangent velocity or acceleration, is obtained by fixtures, which can be adjusted in accordance with manufacturing conditions; and
7) the transfer of precision to variation is simplified and easy to be controlled.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An assembly method for assembling a supporting disk to a rotor, comprising steps of:
   providing a set of fixture;
   mounting said supporting disk having a functional axis and said rotor having a rotation axis on said set of fixture and using the set of fixture to adjust a relative position of said supporting disk to said rotor;
   aligning said functional axis of said supporting disk to the rotation axis of said rotor; and
   after adjusting the relative position of said supporting disk to said rotor, fixing said supporting disk to said rotor,
   wherein said set of fixture comprises a functional axis fixture and an adjusting axis fixture,
   wherein said functional axis fixture comprises a plate having a shape the same as an object to be carried by said supporting disk, and an angular adjusting mechanism for adjusting angle of said plate.

2. The assembly method for assembling a supporting disk to a rotor according to claim 1, wherein said functional axis is one chosen from a group of bias, concentricity, columnar variance, vibration, angular shift, angular velocity, tangent velocity and acceleration.

3. The assembly method for assembling a supporting disk to a rotor according to claim 1, wherein said supporting disk is fixed with an anti-glide ring made of frictional material.

4. The assembly method for assembling a supporting disk to a rotor according to claim 1, wherein said supporting disk is for carrying an optical disk.

5. The assembly method for assembling a supporting disk to a rotor according to claim 1, wherein said supporting disk and said rotor are fixed by one binding and welding.

6. The assembly method for assembling a supporting disk to a rotor according to claim 5, wherein said binder is chosen from a group of adhesive, non-metallic fillers and metallic fillers.

7. The assembly method for assembling a supporting disk to a rotor according to claim 5, wherein said welding is one of contact and non-contact method chosen from a group of laser welding, ultrasonic welding and thermal welding.

8. The assembly method for assembling a supporting disk to a rotor according to claim 1, wherein said functional axis fixture further comprises a cavity for receiving said supporting disk.

9. The assembly method for assembling a supporting disk to a rotor according to claim 8, wherein said functional axis fixture further comprises a horizontal adjusting mechanism for adjusting position of said plate.

10. The assembly method for assembling a supporting disk to a rotor according to claim 1, wherein said adjusting axis fixture is for supporting said rotor.

11. The assembly method for assembling a supporting disk to a rotor according to claim 10, wherein said adjusting axis fixture comprises a height adjusting mechanism for adjusting height of said rotor mounted in said adjusting axis fixture.

12. The assembly method for assembling a supporting disk to a rotor according to claim 1, wherein said functional axis fixture and said adjusting axis fixture are engaged together to carry out said aligning step.

13. A assembly method for assembling a supporting disk to a rotor, comprising steps of:
- providing a set of fixture for adjusting a relative position of said supporting disk to said rotor;
- mounting said supporting disk having a functional axis and said rotor having a rotation axis on said set of fixture;
- aligning said functional axis of said supporting disk to the rotation axis of said rotor; and
- fixing said supporting disk to said rotor,
- wherein said functional axis fixture comprises a cavity for receiving said supporting disk; and a plate having a shape the same as an object to be carried by said supporting disk,
- wherein said functional axis fixture further comprises a horizontal adjusting mechanism for adjusting position of said plate.

14. A assembly method for assembling a supporting disk to a rotor, comprising steps of:
- providing a set of fixture for adjusting a relative position of said supporting disk to said rotor;
- mounting said supporting disk having a functional axis and said rotor having a rotation axis on said set of fixture;
- aligning said functional axis of said supporting disk to the rotation axis of said rotor; and
- fixing said supporting disk to said rotor,
- wherein said set of fixture comprises a functional axis fixture and an adjusting axis fixture,
- wherein said adjusting axis fixture is for supporting said rotor,
- wherein said adjusting axis fixture comprises a height adjusting mechanism for adjusting height of said rotor mounted in said adjusting axis fixture.

* * * * *